April 21, 1953  A. E. YEAGER  2,635,296
COTTON-SEPARATOR MACHINE
Filed Sept. 16, 1949  2 SHEETS—SHEET 1
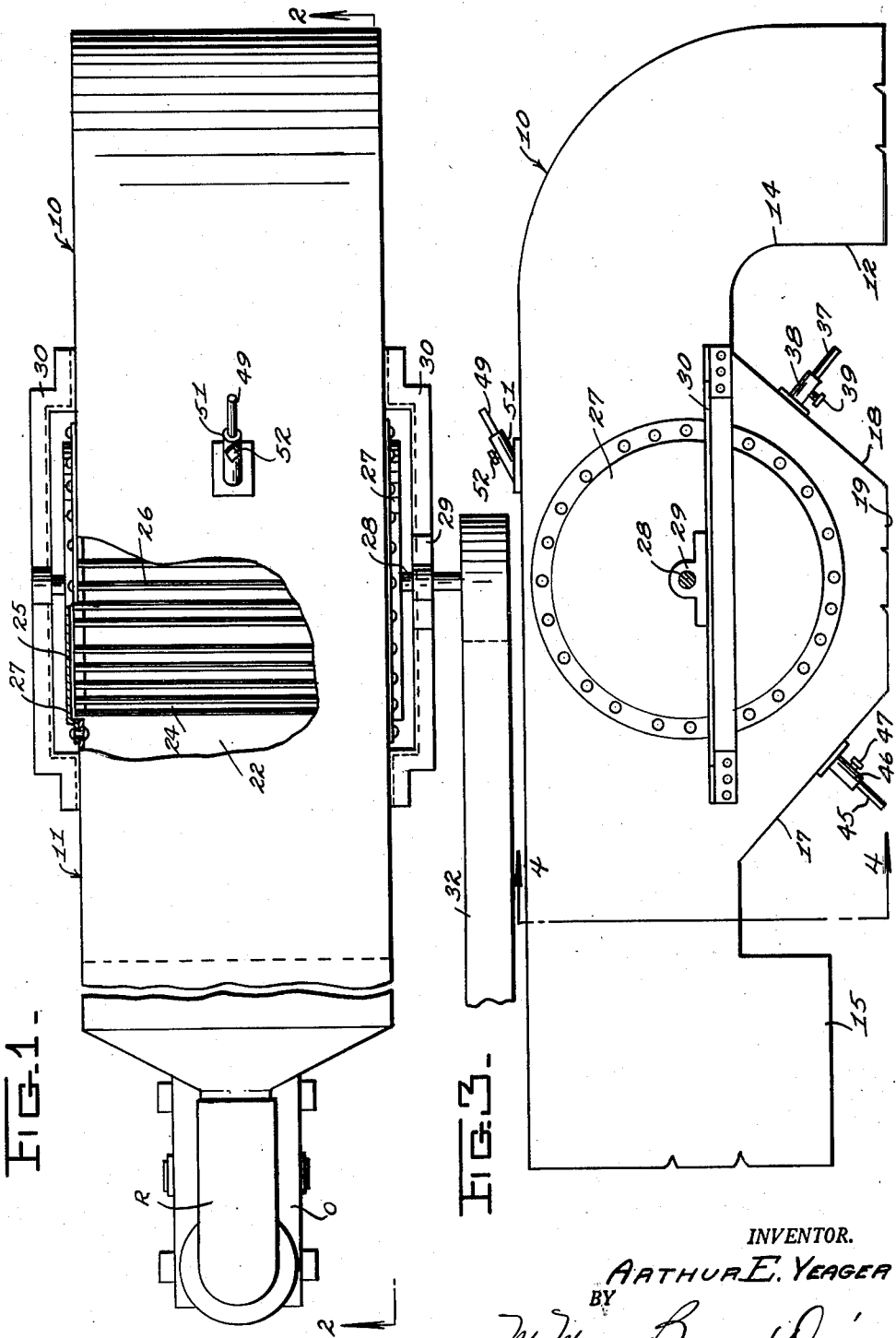
INVENTOR.
ARTHUR E. YEAGER
BY
McMorrow, Berman & Davidson
ATTORNEYS April 21, 1953 A. E. YEAGER 2,635,296
COTTON-SEPARATOR MACHINE
Filed Sept. 16, 1949 2 SHEETS—SHEET 2
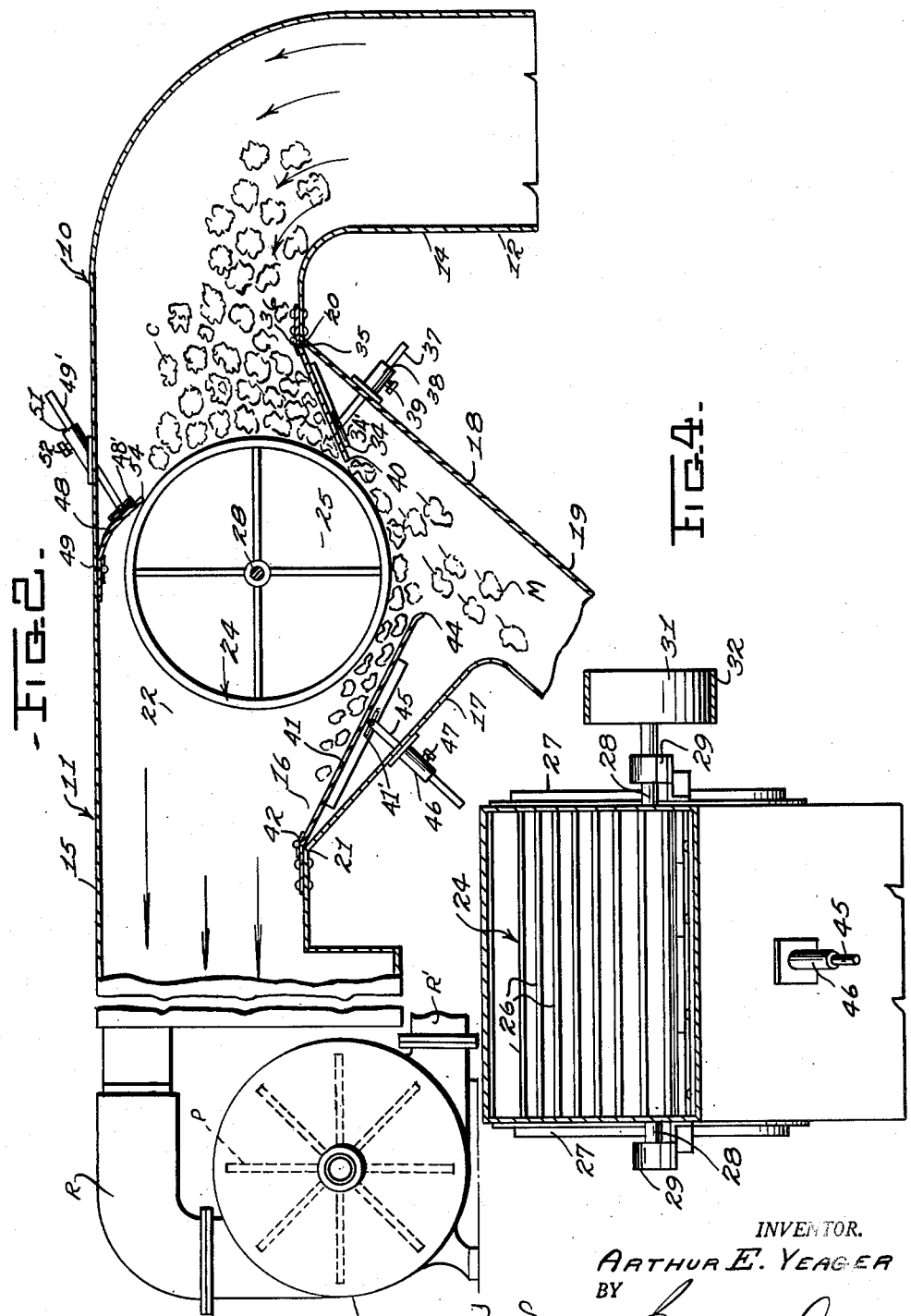
INVENTOR.
ARTHUR E. YEAGER
BY
ATTORNEYS

UNITED STATES PATENT OFFICE 2,635,296

COTTON-SEPARATOR MACHINE

Arthur E. Yeager, Brownfield, Tex.

Application September 16, 1949, Serial No. 116,127

5 Claims. (Cl. 19—76)

This invention relates to a cotton-separating machine, and more particularly to a machine for separating green cotton, grubs, stones, and other foreign material from the harvested cotton before the cotton has been to the gin or cotton mill.

It is an object of this invention to provide a cotton separator of the kind to be more particularly described hereinafter, which is formed for extracting the suitable cotton from the harvested material and discharging the foreign matter.

Another object of this invention is to provide a cotton-separating machine of this kind which is provided with movable baffle members which control the clearance space about the beater for controlling the general efficiency of the machine and for adapting the machine to various terrain or environments to be encountered in a particular location.

With the above and other objects in view, my invention consists in the arrangement, combination and details of construction disclosed in the drawings and specification, and then more particularly pointed out in the appended claims.

In the drawings:

Figure 1 is a top plan view, partly broken away and partly in section, of a cotton separator constructed according to an embodiment of this invention;

Figure 2 is a fragmentary longitudinal section taken on the line 2—2 of Figure 1;

Figure 3 is a side elevation of the cotton-separating machine;

Figure 4 is a transverse section taken on the line 4—4 of Figure 3.

Referring to the drawings, the numeral 10 designates generally a cotton-separating machine for separating the ripe or desired cotton from the grub and other foreign material which is taken up at the time of harvesting the cotton. The cotton-separating machine 10 is formed for separating the desirable cotton from the green cotton and the grub as the cotton is being harvested, the machine 10 being formed for separating and discharging the undesirable or foreign material and for moving the desirable cotton forwardly to be further handled by a cotton gin or cotton mill.

The cotton-separating machine 10 is formed of an elongated tubular body 11, open at the opposite ends thereof, one of the ends being directed downwardly for picking up the cotton and other material to be collected. The rear end 12 of the body 11 is open at the lower end of the vertical arm 14, and the material picked up at the lower open end of the arm 14 is then brought upwardly through the body 10 to the rear end of the horizontal portion 15. The extreme upper end of the vertical arm 14 is in communication with the rear end of the horizontal tubular arm 15, as clearly noted in Figure 2 of the drawings, the connection between the vertical arm 14 and the horizontal tubular arm 15 being accomplished by a curved or bowed connecting section.

The horizontal arm 15 of the body 11 is formed with a bottom opening 16 intermediate the length thereof. The opening 16 is communicated with the upper end of a conical discharge tubular member 19 which opens into the bottom portion of the horizontal tubular member 15 and converges downwardly therebelow. One side 18 of the downwardly-convergent discharge tube 19 is engaged at its rear end with the rear transverse edge 20 of the opening 16 and the forward edge of the tubular member 19 is connected, as noted by the numeral 21, to the transverse forward edge of the opening 16 providing a sort of hopper intermediate the length of the body 11 and intermediate the length of the tubular member 15 which is disposed horizontally of the body 11.

The upper conical end of the discharge tube 19, together with the intermediate portion 22 of the tubular member 15, constitutes a separating chamber in which the separation of the grub and foreign material from the cotton is accomplished.

A beater 24 is rotatably mounted in the body 11 within the separating chamber 22 and extends downwardly within the upper end of the tubular discharge member 19.

The beater 24 is formed as a cylindrical body which is defined by a pair of circular end plates 25 connected together by a plurality of circumferentially-disposed transverse bars or members 26. The transverse bars 26 are of a length slightly greater than the width of the body 11 at the separating chamber 22, and extend outwardly through openings in the respective side walls of the body 11, as clearly noted in Figure 1 of the drawings. The end plates or discs 25 are disposed outwardly of the side walls of the body 11 and are enclosed in outwardly-offset pockets or recesses 27 on the respective sides of the body, as clearly noted in Figures 1 and 3 of the drawings. A transverse axle 28 is fixed through the center of the opposite end plates 25 and extends outwardly at the opposite ends of the beater 24 through the opposite side walls of the housing 11. The opposite ends of the axle 28 are journaled in bearings 29 mounted on supporting members 30 fixed on the respective outer sides of the side walls of the housing 11, as clearly noted in Figures 1 and 3 of the drawings.

One end of the axle 28 is extended farther outwardly from the side wall of the body 11 and a suitable pulley wheel 31 is fixedly mounted thereon for engagement with a belt 32 which will be secured at its other end, not shown in the drawings, to a suitable source of power. The movement of the belt 32 will directly effect the rotation of the beater 24 within the housing 11 for separating the desirable cotton from the green cotton and other foreign material which is picked up with the cotton in the process of harvesting the cotton.

As noted in Figure 2 of the drawings, the diameter of the end plates 25 of the beater 24 is greater than the vertical height of the chamber 22 defined by the bottom wall of the housing 11, but is substantially smaller than the vertical height of the chamber 22 which is defined by the upper portion of the body 15 between the transverse side walls thereof and the upper end of the hopper.

For separating the desirable cotton from the undesirable material, there is provided a baffle member 34 pivotally mounted adjacent the rear edge of the opening 16. The baffle member or plate 34 is pivotally mounted at its rearmost transverse edge 35 to the rear transverse edge of the opening 16 by a hinge member 36 and the forward transverse edge of the baffle member 34 is disposed for selected disposition relative to the periphery of the beater 24, as clearly noted in Figure 2 of the drawings.

A link or control arm 37 is slidably connected at its inner end to a slot 34' formed in the baffle member 34 and extends downwardly and rearwardly through the rear wall 18 of the tubular discharge member 19 and through a ferrule 38 which is fixedly mounted on the lower side of the hopper. A set screw 39 is threadably engaged through one wall of the ferrule 38 for frictional engagement at its inner end with the outer surface of the link 37 to secure the link in a selected position and thereby secure the baffle member 34 in a selected pivoted position. The baffle member is swingably mounted so that the forward transverse edge 40 will be positioned relative to the periphery of the beater 24 in a selected spaced-apart position for restricting the passage through which the cotton and other material will be drawn, the restricted passage assisting in the separation of the desirable cotton from the other foreign material.

A second baffle member 41 is pivotally mounted at the forward edge 21 of the opening 16 and is pivotally connected by a hinge 42 to the forward transverse edge of the opening 16, the baffle 41 being disposed in confronting relation to the baffle 34 described above. The rear edge 44 of the baffle member 41 is adapted to be positioned below the forward portion of the reel or beater 24, as clearly shown in Figure 2 of the drawings, and will be supported in its selected spaced-apart relation to the beater by the link 45 which is slidably connected at its upper end to a slot 41' formed in the baffle plate 41 and extends downwardly and outwardly through the forward wall 17 of the hopper. The outer end of the link 45 is slidably engaged through a ferrule 46 on the forward side of the discharge member 19, and the link 45 is secured in a selected position by a set screw 47 which is threadably engaged through the ferrule 46 and will lock the link 45 and the baffle 41 in their selected positions.

In the normal operating positions of the baffles 34 and 41, the forward transverse edge of the baffle 34 will be disposed in slightly spaced-apart relation to the periphery of the beater 24, whereas the rear transverse edge of the baffle 41 will be disposed substantially below the lower side of the beater 24 a greater distance than the space between the beater and the baffle member 34.

A third baffle member 48 is pivotally disposed within the housing 11 above the beater 24, as clearly shown in Figure 2 of the drawings. The baffle plate 48 is fixedly secured to one side of a hinge 49, the other side of the hinge 49 being fixedly secured transversely to the top wall of the housing 11. The baffle 48 is arcuately shaped, rather than flat as the baffles 34 and 41 described above, the baffle 48 being positioned at the top portion of the beater 24 for preventing the passage of the cotton or other harvested material over the top of the beater. A link or connecting arm 49' is slidably connected at its inner end to a slot 48' formed in the baffle 48 and extends outwardly through a ferrule 51 fixedly secured to the outer surface of the upper side of the housing 11. A set screw 52 is threadably engaged through the ferrule 51 and will bear at its inner end against the outer surface of the link 49' for locking the link in a selected position and thereby securing the baffle 48 in a selected pivoted position. In the normal position of the baffle 48, the rear transverse edge 54 will be positioned in very close proximity to the periphery of the beater for excluding the movement of the cotton C and other material M over the top of the beater 24.

In the use and operation of the cotton-separating machine 10, a conventional source of vacuum or suction means, such as illustrated in Figures 1 and 2 of Patent No. 577,153, is applied to the front end 15 of the body 11 for drawing cotton and other material upwardly through the rear open end of the body 11. As depicted on the drawings, the aforesaid suction means comprises a fan wheel P which is mounted in the casing O, the casing having a duct R leading from the interior thereof and connected to the front end 15 of the body 11 and having a pipe R' leading to the outside atmosphere. The proper positioning of the baffle member 48 is initially determined to prevent the cotton C and other material M from being moved along the length of the horizontal body member 15 over the beater 24, but to confine the passage of the cotton and other material through the hopper below the beater, as clearly shown in Figure 2 of the drawings. The baffle member 34 will then be initially set in spaced-apart relation to the beater 24 for confining the passage of the material in such a manner that the vacuum or suction at the forward end of the body 11 will move the ripe cotton forwardly in engagement with the transverse bars 26 of the beater 24, while the heavier material, such as the green cotton, the grub, stones and other foreign material being heavier than the ripe cotton, will fall downwardly into the discharge tube 19 through the discharge opening 16, as clearly noted in Figure 2 of the drawings. The forwardmost baffle member 41 will be positioned in its spaced-apart relation to the beater 24 a greater distance away from the periphery thereof than the space between the baffle 34 and the beater so that the cotton which is substantially in engagement with the beater 24 may be moved forwardly along the length of the body 11 through the forward open end where it may be taken to a gin or cotton mill. The rotation of the beater 24 is effected by a suitable power means, not shown in the drawings, for driving the belt 32 which in turn will rotate the wheel or pulley 31 and the shaft or axle 28 which is fixed to the center of the beater 24.

I do not mean to confine myself to the exact details of construction herein disclosed, but claim all variations falling within the purview of the appended claims.

I claim:

1. In a cotton separator, a tubular body having an open intake end for receiving harvested cotton and having a discharge end, suction means disposed adjacent the discharge end for moving the cotton through the body, said body having a top wall and a bottom wall, said bottom wall being formed with an opening for the discharge of foreign material heavier than the cotton, a hopper connected to the bottom wall and communicating with the opening, a beater rotatably journaled transversely in the body and disposed below the top wall and within the opening in the bottom wall, baffle members hingedly connected to the bottom wall and disposed transversely within the opening therein, said baffle members underlying the lower portion of the beater, means for locking the baffle members in adjusted positions during rotative movement of the beater, and adjustable baffle means carried by the top wall and overlying the beater.

2. In a cotton separator, a tubular body having an open intake end for receiving harvested cotton and having a discharge end, suction means disposed adjacent the discharge end for moving the cotton through the body, said body having a top wall and a bottom wall, said bottom wall being formed with an opening for the discharge of foreign material heavier than the cotton, a hopper connected to the bottom wall and communicating with the opening, a beater rotatably journaled transversely in the body and disposed below the top wall and within the opening in the bottom wall, a first baffle member hingedly connected to an edge of said opening near the middle of the bottom wall adjacent to the intake end of the body and underlying the beater, said first baffle member being transversely disposed into the opening in the bottom wall and forming an adjustable prolongation of the bottom wall, means for locking the first baffle member in adjusted positions, a second baffle member hingedly connected to an opposite edge of said opening near the middle of the bottom wall adjacent to the discharge end of the body and underlying the beater, said second baffle member being disposed into the opening in the bottom wall, means for locking said second baffle member in selected positions relative to the beater, the baffles having free edges spaced out of engagement beneath the beater and forming an opening for the gravitation of the foreign material into the hopper, and adjustable baffle means depending from the top wall and overlying the beater.

3. In a cotton separator, a tubular body having an intake end and a discharge end, suction means disposed adjacent said discharge end for moving the material through the body, said body having a top wall and a bottom wall, said bottom wall having a transverse opening formed therein for the gravitation of foreign particles heavier than the cotton from the body, a beater rotatably journaled transversely in the body and having its lower portion positioned within the opening, a hopper connected to the bottom wall and communicating with the opening, a first baffle member hingedly connected transversely to the bottom wall at the forward portion of the opening, said first baffle member being disposed within the opening and underlying the beater in spaced adjustable fashion, means for locking the first baffle member in adjusted positions so that the first baffle member defines an adjustable prolongation of the bottom wall, a second baffle member hingedly connected to the bottom wall at the rearward part of the opening, means for locking the second baffle member in adjusted positions relative to the beater, said baffle members having free edges spaced out of engagement and forming an adjustable outlet for the foreign particles.

4. In a cotton separator, a tubular body having an intake end and a discharge end, suction means disposed adjacent said discharge end for moving the material through the body, said body having a top wall and a bottom wall, said bottom wall having a transverse opening formed therein for the gravitation of foreign particles heavier than the cotton from the body, a beater rotatably journaled transversely in the body and having its lower portion positioned within the opening, a hopper connected to the bottom wall and communicating with the opening, a first baffle member hingedly connected transversely to the bottom wall at the forward portion of the opening, said first baffle member being disposed within the opening and underlying the beater in spaced adjustable fashion, means for locking the first baffle member in adjusted positions so that the first baffle member defines an adjustable prolongation of the bottom wall, a second baffle member hingedly connected to the bottom wall at the rearward part of the opening, means for locking the second baffle member in adjusted positions relative to the beater, said baffle members having free edges spaced out of engagement and forming an adjustable outlet for the foreign particles, said locking means for said first baffle member including a link pivotally attached to the baffle member and slidably disposed through the forward wall of the hopper, and means carried by the wall of the hopper for locking the link in adjusted positions.

5. In a cotton separator, a tubular body having an intake end and a discharge end, suction means disposed adjacent said discharge end for moving the material through the body, said body having a top wall and a bottom wall, said bottom wall having a transverse opening formed therein for the gravitation of foreign particles heavier than the cotton from the body, a beater rotatably journaled transversely in the body and having its lower portion positioned within the opening, a hopper connected to the bottom wall and communicating with the opening, a first baffle member hingedly connected transversely to the bottom wall at the forward portion of the opening, said first baffle member being disposed within the opening and underlying the beater in spaced adjustable fashion, means for locking the first baffle member in adjusted positions so that the first baffle member defines an adjustable prolongation of the bottom wall, a second baffle member hingedly connected to the bottom wall at the rearward part of the opening, means for locking the second baffle member in adjusted positions relative to the beater, said baffle members having free edges spaced out of engagement and forming an adjustable outlet for the foreign particles, said beater being spaced from the top wall, a baffle carried by the top wall, said baffle having a free edge disposed adjacent the beater, and means for adjustably mounting the baffle on the top wall to adjustably position the free edge thereof relative to the beater.

ARTHUR E. YEAGER.

References Cited in the file of this patent

UNITED STATES PATENTS

| Number | Name | Date |
|---|---|---|
| 81,622 | Gilman | Sept. 1, 1868 |
| 631,800 | Lemoine | Aug. 29, 1899 |
| 656,107 | Graber | Aug. 14, 1900 |
| 1,369,716 | Stacey | Feb. 22, 1921 |
| 2,300,978 | Sheppard | Nov. 3, 1942 |

FOREIGN PATENTS

| Number | Country | Date |
|---|---|---|
| 709,459 | France | May 18, 1931 |